United States Patent [19]

Yoshitake et al.

[11] Patent Number: 5,247,625
[45] Date of Patent: Sep. 21, 1993

[54] SYSTEM FOR CHECKING UNDEFINED ADDRESSING PRESCRIBED FOR EACH INSTRUCTION OF VARIABLE LENGTH USING TAG INFORMATION TO DETERMINE ADDRESSING FIELD DECODED IN PRESENT OR PRECEDING CYCLE

[75] Inventors: Akihiro Yoshitake; Toshiharu Ohashima, both of Kawasaki, Japan

[73] Assignee: Fujitsu Limited, Kawasaki, Japan

[21] Appl. No.: 580,791

[22] Filed: Sep. 11, 1990

[30] Foreign Application Priority Data

Sep. 11, 1989 [JP] Japan ................................. 1-233008

[51] Int. Cl.⁵ ........................................... G06F 9/30
[52] U.S. Cl. .............................. 395/375; 364/228.7; 364/254.1; 364/DIG. 1; 364/964.26; 395/800
[58] Field of Search ........................... 395/375, 800

[56] References Cited

U.S. PATENT DOCUMENTS

| 3,859,636 | 1/1975 | Cook | 395/375 |
|---|---|---|---|
| 4,253,142 | 2/1981 | Bavoux et al. | 395/375 |
| 4,689,765 | 8/1987 | Hooper | 395/775 |
| 4,691,279 | 9/1987 | Danilenko et al. | 395/250 |
| 4,739,472 | 4/1988 | Hayashi | 395/375 |
| 4,897,787 | 1/1990 | Kawasaki et al. | 395/375 |
| 4,907,192 | 3/1990 | Kaneko | 395/375 |
| 5,051,940 | 9/1991 | Vassiliadis et al. | 364/736 |
| 5,053,954 | 10/1991 | Miyoshi | 395/375 |

FOREIGN PATENT DOCUMENTS 62-197830 9/1987 Japan .

Primary Examiner—Robert B. Harrell
Assistant Examiner—Meng-Ai T. An
Attorney, Agent, or Firm—Staas & Halsey

[57] ABSTRACT

A data processor decoding and executing a train of instructions including a plurality of sets of an instruction code field and a corresponding addressing field. The data processor includes a decoding unit for decoding the instruction code field and the corresponding addressing field, and outputting an instruction tag information and an addressing information, respectively, in response to a control signal generated at a predetermined frequency; a holding unit for holding the addressing information fed from the decoding unit, and outputting a holding result in response to the control signal; and a detecting unit responsive to the instruction tag information, addressing information and holding result. The detecting unit effects a judgement of whether the instruction tag information indicates that it is an instruction to check undefined addressing of the addressing field decoded in the preceding stage or in the present stage, and detects the undefined addressing based on a result of the judgement. As a result, it becomes possible to check undefined addressing prescribed for each instruction without lowering instruction execution performance of the data processor.

5 Claims, 9 Drawing Sheets

| INST. TAG (IC) | | | | FIRST EA | | | | | SECOND EA | |
|---|---|---|---|---|---|---|---|---|---|---|
| | | | | MEMORY INDIRECT | REG. DIRECT | IMMEDIATE | S.P. RELATIVE | MULTI-STAGE INDIRECT | MEMORY INDIRECT | MULTI-STAGE INDIRECT |
| 3 | 2 | 1 | 0 | | | | | | | |
| 0 | 0 | 0 | 0 | ✱ | ✱ | ✱ | ✱ | ✱ | ✱ | ✱ |
| 0 | 0 | 0 | 1 | x | O | x | x | x | ✱ | ✱ |
| 0 | 0 | 1 | 0 | x | O | x | x | x | x | x |
| 0 | 0 | 1 | 1 | x | O | x | x | x | O | x |
| 0 | 1 | 0 | 0 | O | O | O | O | O | x | x |
| 0 | 1 | 0 | 1 | ✱ | ✱ | ✱ | ✱ | ✱ | ✱ | ✱ |
| 0 | 1 | 1 | 0 | O | O | x | x | x | x | x |
| 0 | 1 | 1 | 1 | O | x | x | O | x | x | x |
| 1 | 0 | 0 | 0 | x | O | x | x | x | O | O |
| 1 | 0 | 0 | 1 | x | O | x | x | x | O | O |
| 1 | 0 | 1 | 0 | x | O | x | x | x | x | x |
| 1 | 0 | 1 | 1 | x | O | x | x | x | x | x |
| 1 | 1 | 0 | 0 | O | O | O | O | O | x | x |
| 1 | 1 | 0 | 1 | O | O | O | O | O | x | x |
| 1 | 1 | 1 | 0 | O | x | x | O | x | x | x |
| 1 | 1 | 1 | 1 | O | x | x | O | x | x | x |

O ⋯ EFFECTIVE ADD.
X ⋯ UNDEFINED ADD.
✱ ⋯ NO CHECK (DON'T CARE)

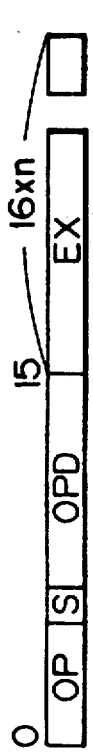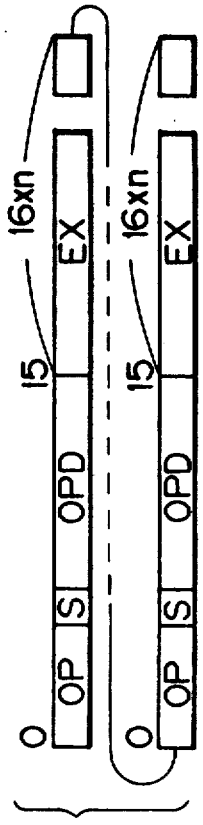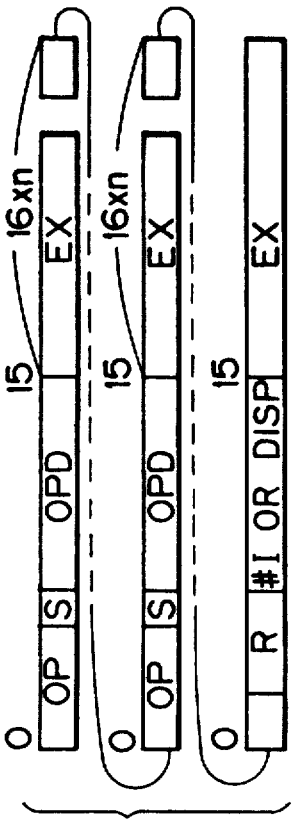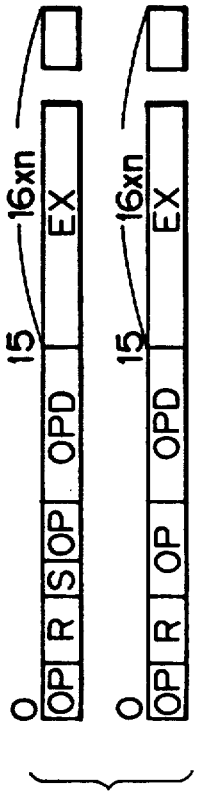
*Fig. 9a* (ONE OPERAND)  
*Fig. 9b* (TWO OPERANDS)  
*Fig. 9c* (EXTENDED OPERAND)  
*Fig. 9d* (MEMORY-REG.)  
*Fig. 9e* (REG.-REG.)

SYSTEM FOR CHECKING UNDEFINED ADDRESSING PRESCRIBED FOR EACH INSTRUCTION OF VARIABLE LENGTH USING TAG INFORMATION TO DETERMINE ADDRESSING FIELD DECODED IN PRESENT OR PRECEDING CYCLE

BACKGROUND OF THE INVENTION

1. Field of the Invention

The present invention relates to a data processor. The present invention more particularly relates to a technique of checking indefined addressing which is prescribed for each instruction in a microprocessor decoding and executing a train of instructions including a plurality of sets of an instruction code field (hereinafter referred to as an operation code) and a corresponding addressing field.

2. Description of the Related Art

As examples of a train of instructions having a plurality of operation codes and a corresponding plurality of addressing fields, a train of instructions of variable length are known which consist of instruction formats, e.g., as shown in FIG. 9. In the illustration, an operand field OPD corresponds to the addressing field, and an instruction code field OP corresponds to the operation code. The operation code defines the kind of an instruction. By decoding the operation code, the addressing field is checked to see whether it is undefined or defined. Usually, an addressing field is arranged after an operation code. Accordingly, for example, where there is only one operand as shown in FIG. 9a, an operation code OP is first decoded and a corresponding addressing field OPD is then checked to see whether it is undefined or defined. Where the addressing field is defined, the instruction is executed, and where the addressing field is undefined, the execution of the instruction is stopped.

In some trains of instructions, however, there is a case that an addressing field to be checked by an operation code is arranged before the operation code concerned. For example, in decoding a train of instructions including two operands as shown in FIG. 9b, when a second operation code OP is decoded, an addressing field OPD of a preceding operand (a first operand) can be checked to see whether it is undefined or defined. In this case, where the first addressing field OPD is defined, an instruction for the first operand can be executed when the second operation code OP is decoded. Where the first addressing field OPD is undefined, however, the execution of the instruction for the first operand must be stopped by means of a proper processing.

To cope with this matter, a special execution cycle may be set to check an operand for its undefined or defined addressing. Where a microprocessor executes a pipeline processing, however, there is a possibility in that the checking cannot be completed within the prescribed cycle. Namely, a result of the checking may be provided in the next cycle or later. This may delay execution of instructions and thus lower an instruction execution performance of the microprocessor.

SUMMARY OF THE INVENTION

An object of the present invention is to provide a data processor which can check undefined addressing prescribed for each instruction without lowering instruction execution performance of the data processor.

According to the present invention, there is provided a data processor decoding and executing a train of instructions including a plurality of sets of an instruction code field and a corresponding addressing field, the data processor including: a decoding unit for decoding the instruction code field and the corresponding addressing field, and outputting an instruction tag information and an addressing information, respectively, in response to a control signal generated at a predetermined frequency; a holding unit, operatively connected to the decoding unit, for holding the addressing information fed from the decoding unit, and outputting a holding result in response to the control signal; and a detecting unit, operatively connected to the decoding unit and holding unit, for effecting a judgement of whether the instruction tag information indicates that it is an instruction to check undefined addressing of the addressing field decoded in the preceding cycle or in the present cycle, and detecting the undefined addressing based on a result of the judgement.

BRIEF DESCRIPTION OF THE DRAWINGS

Other objects and features of the present invention will be described hereinafter in detail by way of preferred embodiments with reference to the accompanying drawings, in which:

FIG. 7 is a diagram illustrating the kind of instruction codes employed in the embodiment of FIG. 2;

FIG. 8 is a diagram illustrating inhibition rules of instructions employed in the embodiment of FIG. 2; and FIGS. 9a to 9e are views illustrating instruction formats employed in the embodiment of FIG. 2.

DESCRIPTION OF THE PREFERRED EMBODIMENTS

Figure 1:
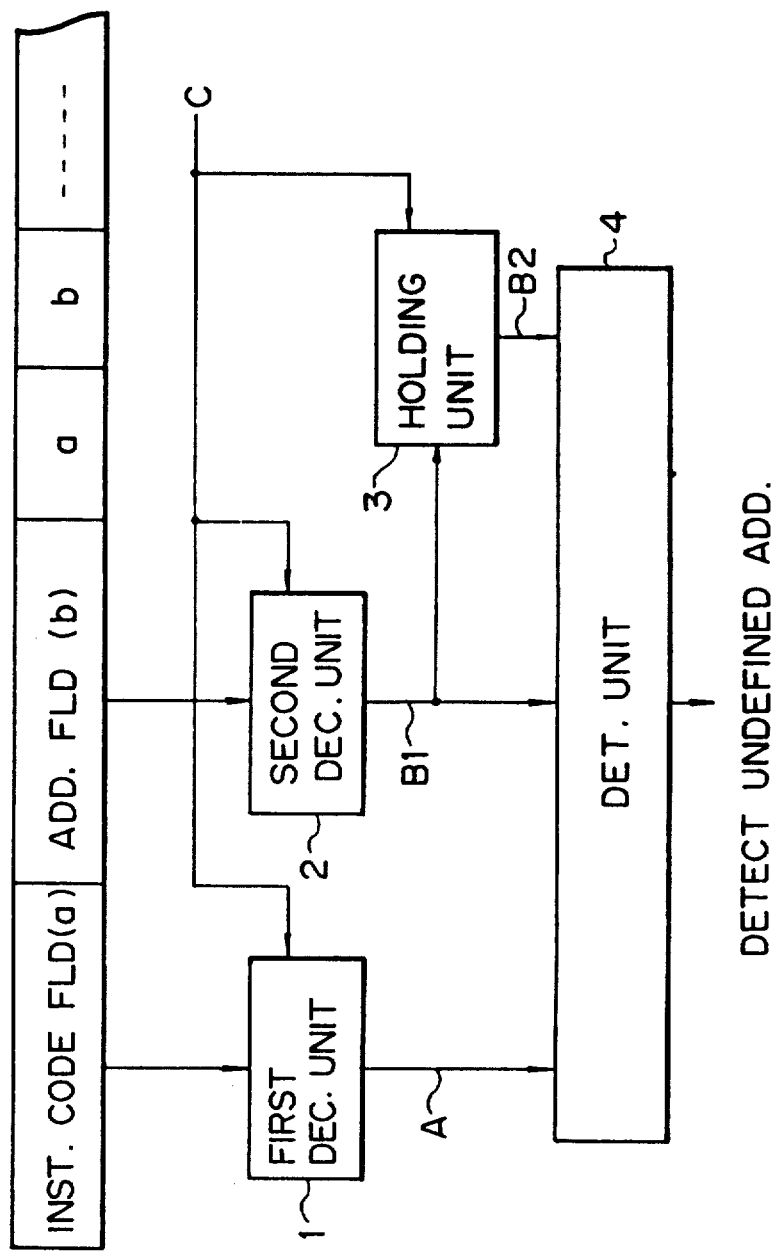
FIG. 1 is a block diagram illustrating the principle of the data processor according to the present invention.

FIG. 1 illustrates the principle of the data processor according to the present invention.

Referring to FIG. 1, the data processor according to the present invention, which decodes and executes a train of instructions including a plurality of sets of an instruction code field (a) and a corresponding addressing field (b), includes a first decoding unit 1 for decoding each instruction code field and outputting instruction tag information A in response to a control signal C generated at a predetermined frequency; a second decoding unit 2 for decoding each addressing field and outputting addressing information B1 in response to the control signal; a holding unit 3 for holding the addressing information fed from the decoding unit, and outputting a holding result B2 in response to the control signal; and a detecting unit (4) for effecting a judgement of whether the instruction tag information indicates that it is an instruction to check undefined addressing of the addressing field decoded in the preceding cycle or in the present cycle, and detecting the undefined addressing based on a result of the judgement.

Where the instruction tag information indicates that it is an instruction to check undefined addressing of the addressing field decoded in the preceding cycle, the detecting unit detects the undefined addressing based on the holding result B2. On the other hand, where the instruction tag information indicates that it is an instruction to check undefined addressing of the addressing field decoded in the present cycle, the detecting unit detects the undefined addressing based on the addressing information B1.

In the above constitution, since the second decoding unit 2 and holding unit 3 respond to the common control signal C, the holding result B2 of the holding unit 3 indicates information decoded in the preceding cycle where the addressing information B1 indicates information decoded in the present cycle.

Therefore, in decoding and executing a train of instructions in which an addressing field to be checked by an operation code is arranged before the operation code concerned, it is possible to check the undefined addressing by means of the detecting unit 4 based on the addressing information B1 or holding result B2. Namely, it becomes unnecessary to set a special cycle for the checking of operands as seen in the prior art it is consequently possible to check inhibition rules of the defined addressing in the preceding stage by decoding the operation code in the present cycle. Accordingly, the data processor of the present invention can check undefined addressing prescribed for each instruction without lowering an instruction execution performance thereof.

Next, a preferred embodiment of the present invention will be explained with reference to FIGS. 2 to 9e.

Figure 2:
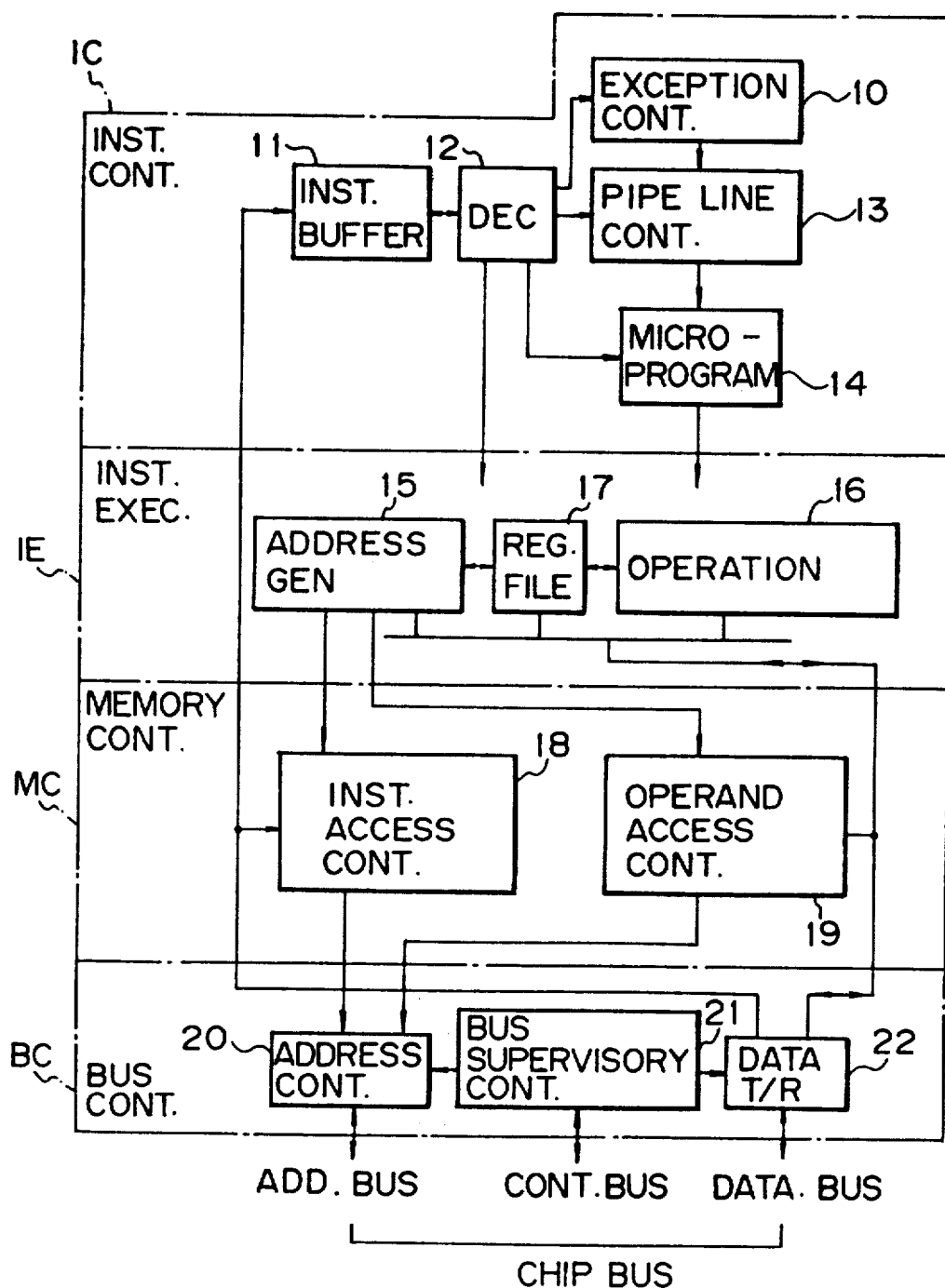
FIG. 2 is a functional block diagram illustrating an entire constitution of the microprocessor according to an embodiment of the present invention.

FIG. 2 is a functional block diagram showing the general constitution of a microprocessor according to an embodiment of the present invention.

The microprocessor according to the present embodiment includes an instruction control unit IC having an exception processing controller 10, an instruction buffer 11, a decoder 12, a pipeline controller 13, and a microprogram 14; an instruction execution unit IE having an address generator 15, an operation unit 16, and a register file 17; a memory control unit MC having an instruction access controller 18 and an operand access controller 19; and a bus control unit BC having an address controller 20, a bus supervisory controller 21, and a data transmitting and receiving unit 22. The instruction control unit IC reads, decodes, and executes instructions. The constitutions and operations of the instruction execution unit IE, memory control unit MC, and bus control unit BC are not directly related to the present invention and thus the explanation thereof is omitted.

Figure 3:
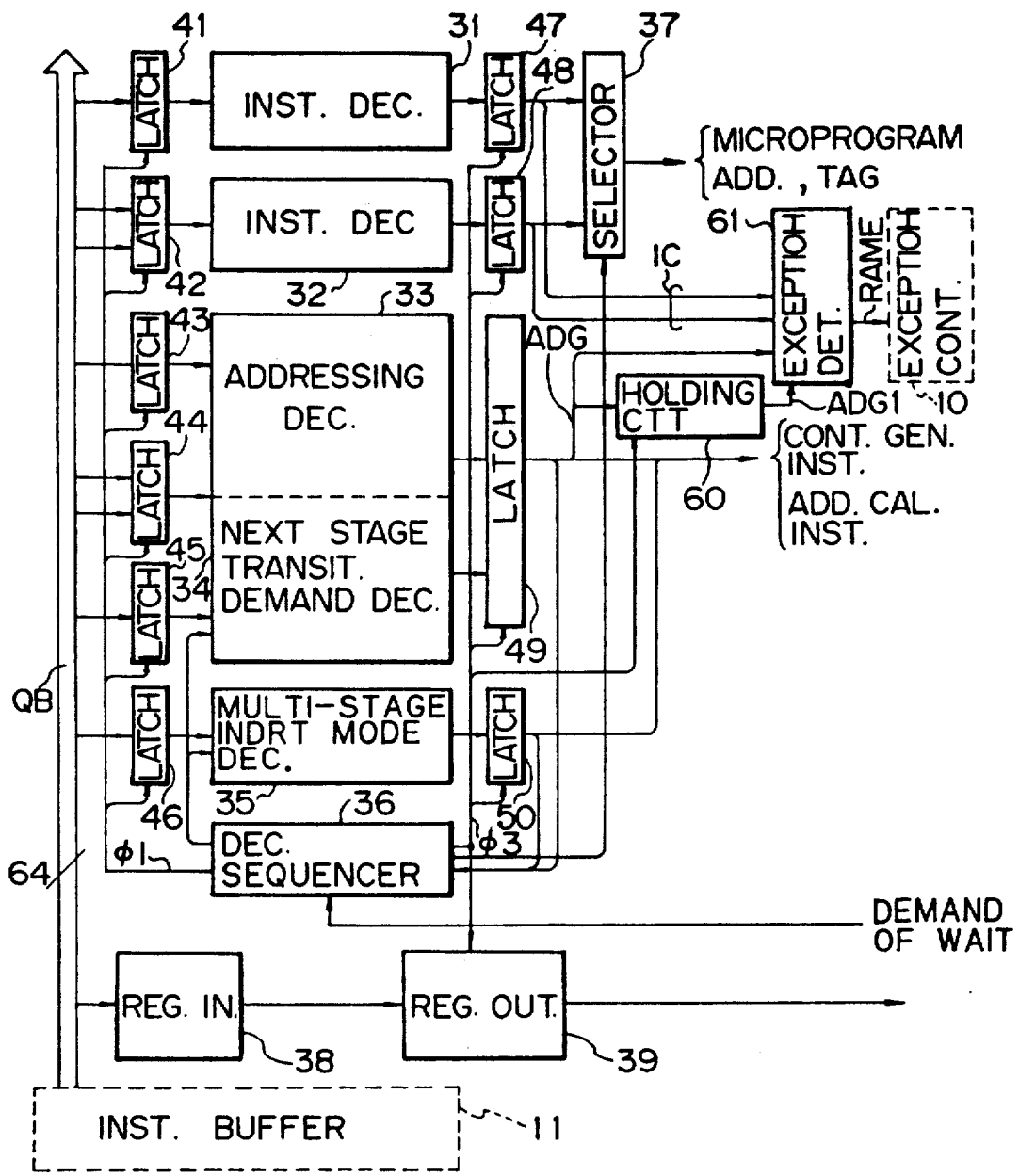
FIG. 3 is a block diagram illustrating a constitution of the decoder shown in FIG. 2.

Next, the constitution of the decoder 12 of the instruction control unit IC will be explained with reference to FIG. 3.

The illustrated decoder 12 includes a first instruction decoding unit 31; a second instruction decoding unit 32; an addressing decoding unit 33 for decoding an addressing field (corresponding to the operand field OPD of FIG. 9) irrespective of the kind of an instruction; a next cycle transition demand decoding unit 34; a multi-cycle indirect mode decoding unit 35; a decoding sequencer 36 for controlling an instruction cycle and sequentially selecting outputs of the respective decoding units; a selector 37 for selecting one of outputs of the first and second instruction decoding units 31 and 32 under the control of the decoding sequencer 36; a register input unit 38 for receiving data from a bus QB; a register output unit 39 for passing an output of the register input unit 38 in response to an internal clock $\phi 3$; latches 41 to 46 disposed on the input sides of the decoding units and responding to a control signal $\phi 1$ from the decoding sequencer 36; and latches 47 to 50 disposed on the output sides of the decoding units and responding to the control signal $\phi 3$ from the decoding sequencer 36.

Furthermore, the decoder 12 includes a holding circuit 60 for holding, in response to the control signal $\phi 3$, addressing information ADG sent from the addressing decoding unit 33 through the latch 49; and an exception detecting unit 61 for detecting undefined addressing for an instruction based on an output ADG1 of the holding circuit, instruction tag information IC sent from the instruction decoding units 31 and 32 through the latches 47 and 48, and the addressing information ADG.

The decoder 12 decodes, with units of 16 bits, a train of instructions of variable length having formats such as those shown in FIGS. 9a to 9e. The train of instructions of variable length is supplied from the instruction buffer 11 through the bus QB to the decoder 12. The decoder separates the instructions into component elements, latches data (the train of instructions of variable length) from the bus QB in response to the control signal $\phi 1$ and according to a stage set by the decoding sequencer 36, and provides decoded results in response to the control signal $\phi 3$. Namely, the decoder 12 decodes the format, addressing mode, and the like, of a supplied instruction, and produces control information such as pipeline control information, operand address calculating information, and microprogram addresses necessary for data processing.

Note, in FIGS. 9a to 9e, reference OPD denotes an operand designating part; reference EX an extended part; reference OP an instruction code part; reference R a register designating part; reference S an operand size designating part; reference #I an immediate value; and reference "disp" a displacement part.

Further, the decoder 12 (especially, the holding circuit 60 and exception detecting unit 61) has functions mentioned below.

The latch 49 for the addressing decoding unit 33 and the holding circuit 60 respond to the common control signal $\phi 3$, so that, where the addressing information ADG indicates information decoded in the present cycle, the output ADG1 of the holding circuit 60 indicates information decoded in the preceding cycle. For example, in decoding a train of instructions involving two operands as shown in FIG. 9b, where the output ADG1 of the holding circuit 60 includes information decoded from the addressing field of a first operand, the instruction tag information IC includes information decoded from an operation code for a second operand, and the addressing information ADG includes information decoded from the addressing field of the second operand.

Therefore, where the instruction tag information IC indicates that it is an instruction to check undefined addressing of the addressing field decoded in the preceding cycle, the exception detecting unit 61 can detect the undefined addressing based on the output ADG1 of the holding circuit 60. Also, where the instruction tag information IC indicates that it is an instruction to check undefined addressing of the addressing field decoded in the present cycle, the exception detecting unit 61 can detect the undefined addressing based on the addressing information ADG from the addressing decoding unit 33.

Next, the circuit constitutions of the main parts of the decoder of FIG. 3, i.e., the peripheral portion of the addressing decoding unit 33 and the exception detecting unit 61 will be explained with reference to FIGS. 4 and 5.

Figure 4:
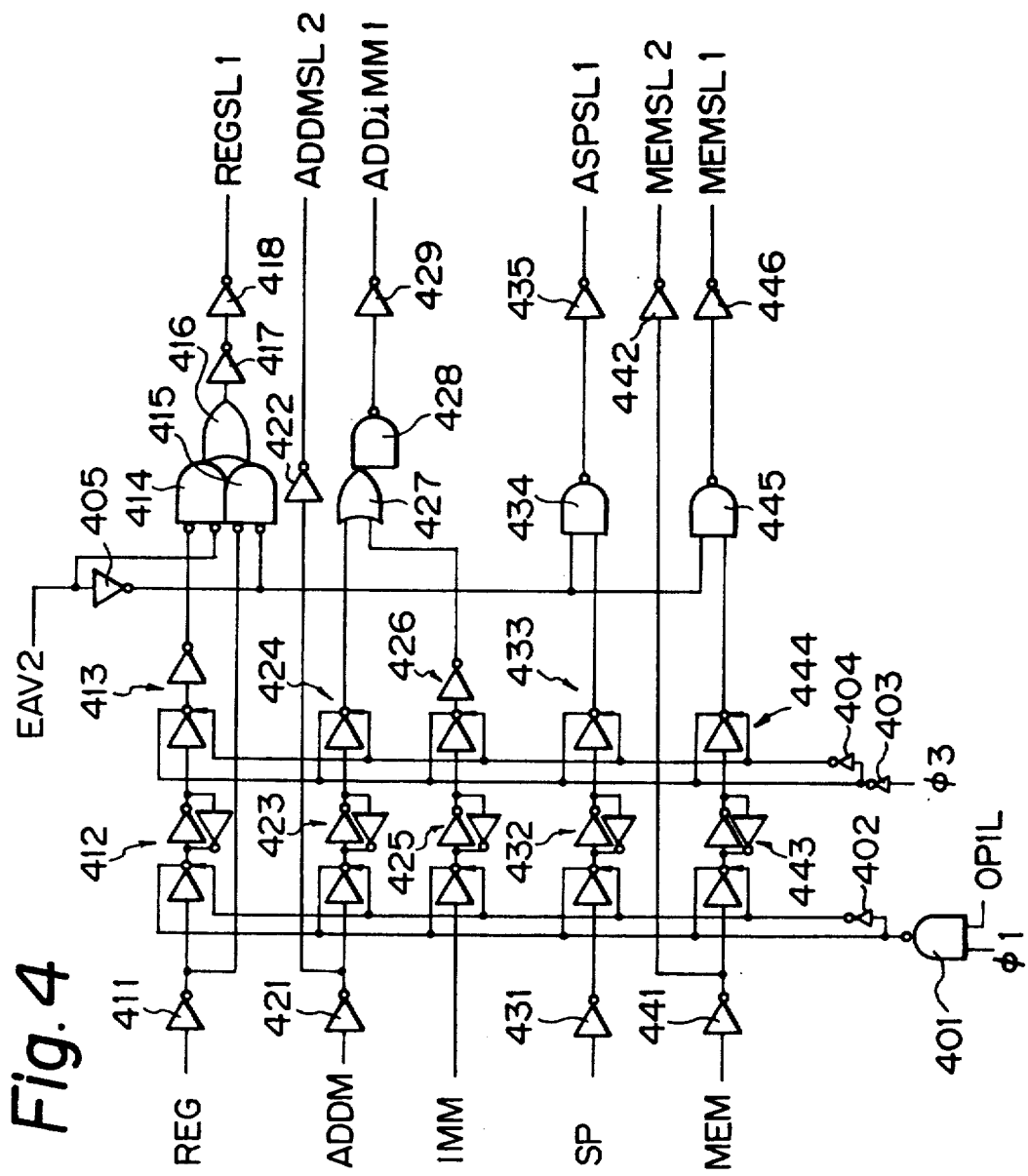
FIG. 4 is a circuit diagram illustrating a constitution of the peripheral portion of the addressing decoding unit shown in FIG. 3.

First, in FIG. 4, reference REG denotes a register direct indication signal; reference ADDM a multi-stage indirect mode indication signal; reference IMM an immediate value signal; reference SP a stack pointer indication signal; and reference MEM a memory indirect indication signal. These signals are parts of information decoded by the addressing decoding unit 33. Also, reference OP1L denotes a latch signal provided after decoding a first operation code (for example, the first instruction code field OP of FIG. 9b), and reference EAV2 denotes a control signal applied when a second effective addressing field is simultaneously decoded.

The circuit of FIG. 4 includes a NAND gate 401 responding to the control signal $\phi 1$ and latch signal OP1L; an inverter 402 responding to an output of the NAND gate 401; an inverter 403 responding to the control signal $\phi 3$; an inverter 404 responding to an output of the inverter 403; and inverter 405 responding to the control signal EAV2; an inverter 411 responding to the register direct indication signal REG; a latch circuit 412 for latching an output of the inverter 411 in response to the output (and its inverted signal) of the NAND gate 401; a latch circuit 413 for latching an output of the latch circuit 412 in response to the control signal $\phi 3$ (and its inverted signal); and AND gate 414 of input inverting type responding to an output of the latch circuit 413 and the control signal EAV2; an AND gate 415 of input inverting type responding to outputs of the inverters 405 and 411; and OR gate 416 responding to outputs of the AND gates 414 and 415; an inverter 417 responding to an output of the OR gate 416; an inverter 418 for providing addressing information REGSL1 in response to an output of the inverter 417; an inverter 421 responding to the added mode indication signal ADDM; an inverter 422 for providing addressing information ADDMSL2 in response to an output of the inverter 421; a latch circuit 423 for latching an output of the inverter 421 in response to the output (and its inverted signal) of the NAND gate 401; a latch circuit 424 for latching an output of the latch circuit 423 in response to the control signal $\phi 3$ (and its inverted signal); a latch circuit 425 for latching the immediate value signal IMM in response to the output (and its inverted signal) of the NAND gate 401; a latch circuit 426 for latching an output of the latch circuit 425 in response to the control signal $\phi 3$ (and its inverted signal); an OR gate 427 responding to outputs of the latch circuits 424 and 426; a NAND gate 428 responding to an output of the OR gate 427; an inverter 429 for providing addressing information ADDiMM1 in response to an output of the NAND gate 428; an inverter 431 responding to the stack pointer indication signal SP; a latch circuit 432 for latching an output of the inverter 431 in response to the output (and its inverted signal) of the NAND gate 401; a latch circuit 433 for latching an output of the latch circuit 432 in response to the control signal $\phi 3$ (and its inverted signal); and NAND gate 434 responding to an output of the latch circuit 433 and the output of the inverter 405; an inverter 435 for providing addressing information ASPSL1 in response to an output of the NAND gate 434; an inverter 441 responding to the memory indirect indication signal MEM; an inverter 442 for providing addressing information MEMSL2 in response to an output of the inverter 441; a latch circuit 443 for latching an output of the inverter 441 in response to the output (and its inverted signal) of the NAND gate 401; a latch circuit 444 for latching an output of the latch circuit 443 in response to the control signal $\phi 3$ (and its inverted signal); a NAND gate 445 responding to an output of the latch circuit 444 and the output of the inverter 405; and an inverter 446 for providing addressing information MEMSL1 in response to an output of the NAND gate 445.

Figure 5:
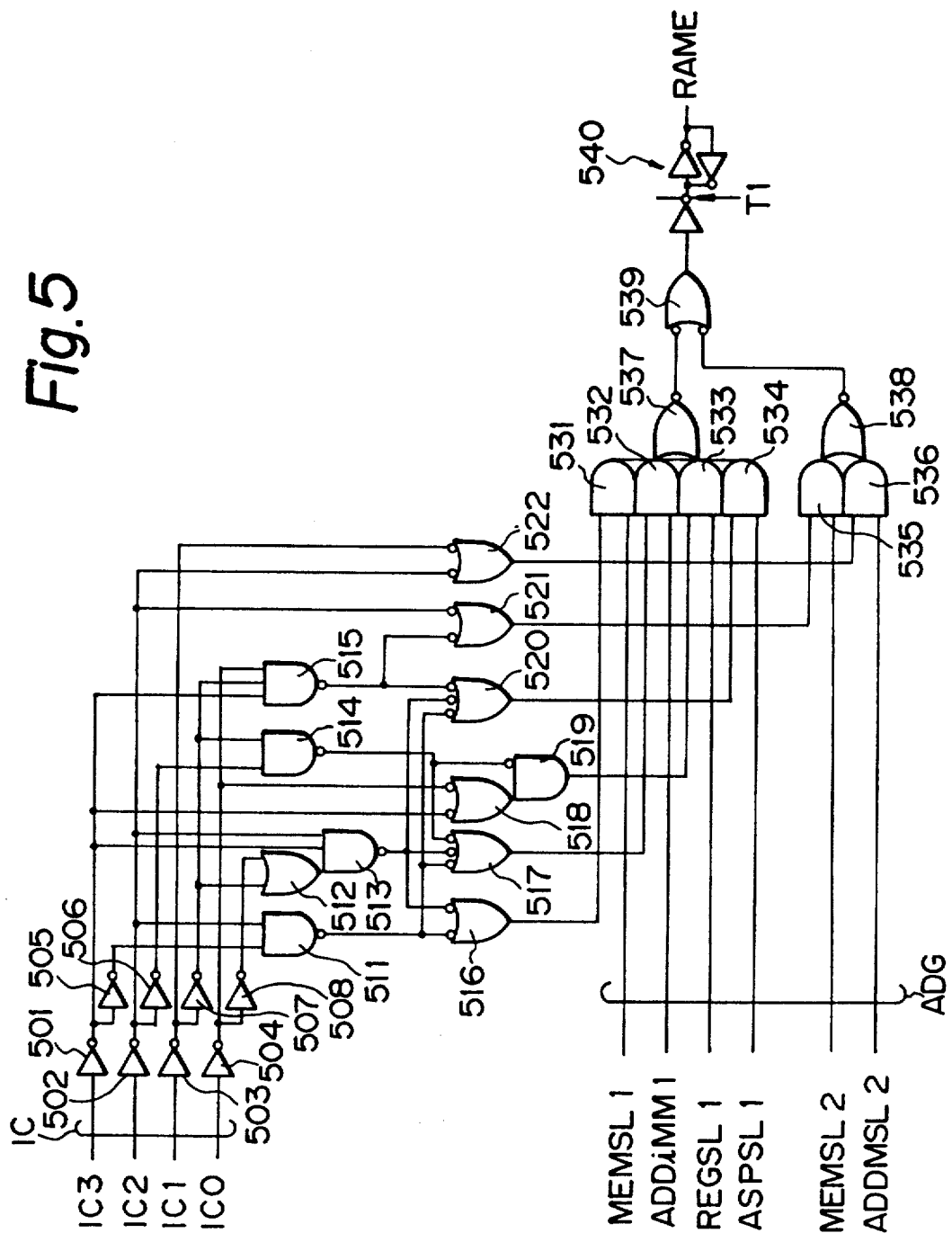
FIG. 5 is a circuit diagram illustrating a constitution of the exception detecting unit shown in FIG. 3.

Next, referring to FIG. 5, the exception detecting unit 61 includes inverters 501 and 504 responding to instruction tag information signals IC3 to IC0, respectively; inverters 505 to 508 responding to outputs of the inverters 501 to 504, respectively; a NAND gate 511 responding to outputs of the inverts 502 and 505; an OR gate 512 responding to outputs of the inverters 507 and 508; a NAND gate 513 responding to an output of the OR gate 512 and outputs of the inverters 501 and 502; a NAND gate 514 responding to outputs of the inverters 506 and 507; a NAND gate 515 responding to outputs of the inverters 501, 504, and 507; an OR gate 516 of input inverting type responding to outputs of the NAND gates 511 and 513; an OR gate 517 of input inverting type responding to outputs of the NAND gates 511, 513, and 514; an OR gate 518 of input inverting type responding to outputs of the inverters 501 and 504; an AND gate 519 responding to an output of the OR gate 518 and an output (input inverted) of the NAND gate 514; an OR gate 520 of input inverting type responding to outputs of the NAND gates 511, 513, and 515; an OR gate 512 of input inverting type responding to an output of the NAND gate 515 and an output of the inverter 502; an OR gate 522 of input inverting type responding to outputs of the inverters 502 and 503; AND gates 531 to 536 responding to outputs of the OR gates 520, 521, and 522, and the addressing information signals MEMSL1, ADDiMM1, REGSL1, ASPSL1, MEMMSL2, and ADDMSL2, respectively; a NOR gate 537 responding to outputs of the AND gates 531 to 534; a NOR gate 538 responding to outputs of the AND gates 535 and 536; an OR gate 539 of input inverting type responding to outputs of the NOR gates 537 and 538; and a latch circuit 540 for latching an output of the OR gate 539 in response to a control signal T1 (the control signal $\phi 1$ of the example of FIG. 6) and providing a reserved instruction exception indication signal RAME.

Figure 7:
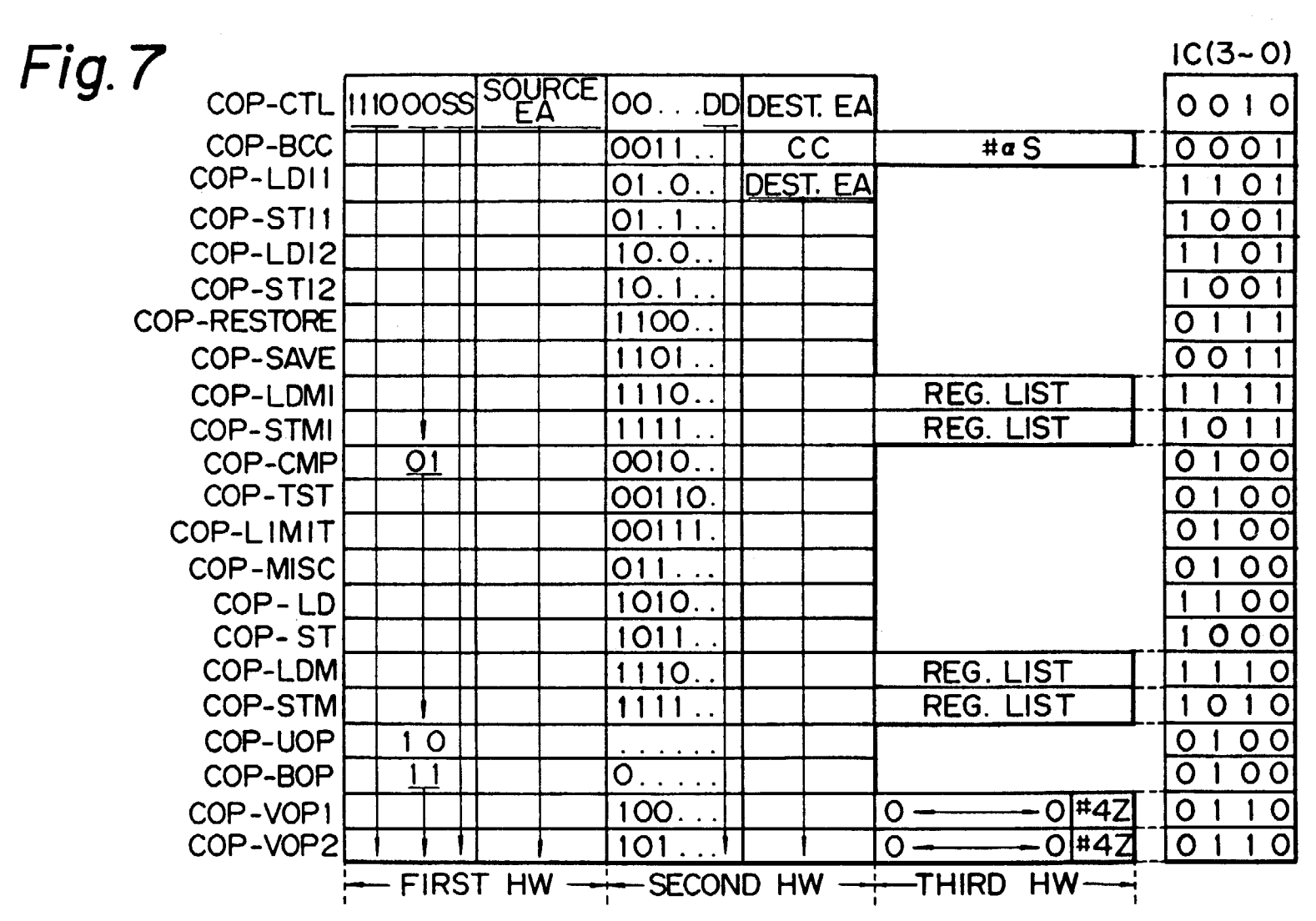

Some of a train of instructions employed in the present embodiment include two operands as shown in FIG. 9b, in which undefined addressing of an addressing mode of a source operand prescribed for each instruction is determined by an operand code to be decoded after the source operand. The kind of instruction codes related to such a case is shown in FIG. 7. In the figure, references COP-CTL, COP-BCC, . . . , denote processor instructions; reference EA an effective addressing; and reference HW a half-word (one half-word consisting of 16 bits).

For the kind of instructions shown in FIG. 7 having different checking rules for undefined addressing, instruction tag information pieces IC3 to IC0 are allocated thereto. When the kind of an instruction is identified, information pieces are provided by the first and second instruction decoding units 31 and 32. FIG. 8 shows inhibition patterns of instructions employed in the present embodiment.

As explained before, the addressing decoding unit 33 decodes an addressing field irrespective of the kind of an instruction, and provides the register direct indication signal REG, added mode indication signal ADDM, stack pointer indication signal SP, and memory indirect indication signal MEM. These signals are latched by the circuit of FIG. 4 during a source addressing decoding cycle in response to the control signal φ1, and held therein. Then, a second operation code is decoded and, when the instruction tag information signals IC3 to IC0 are output, the circuit of FIG. 5 checks whether or not the addressing field is an undefined addressing.

Figure 6:
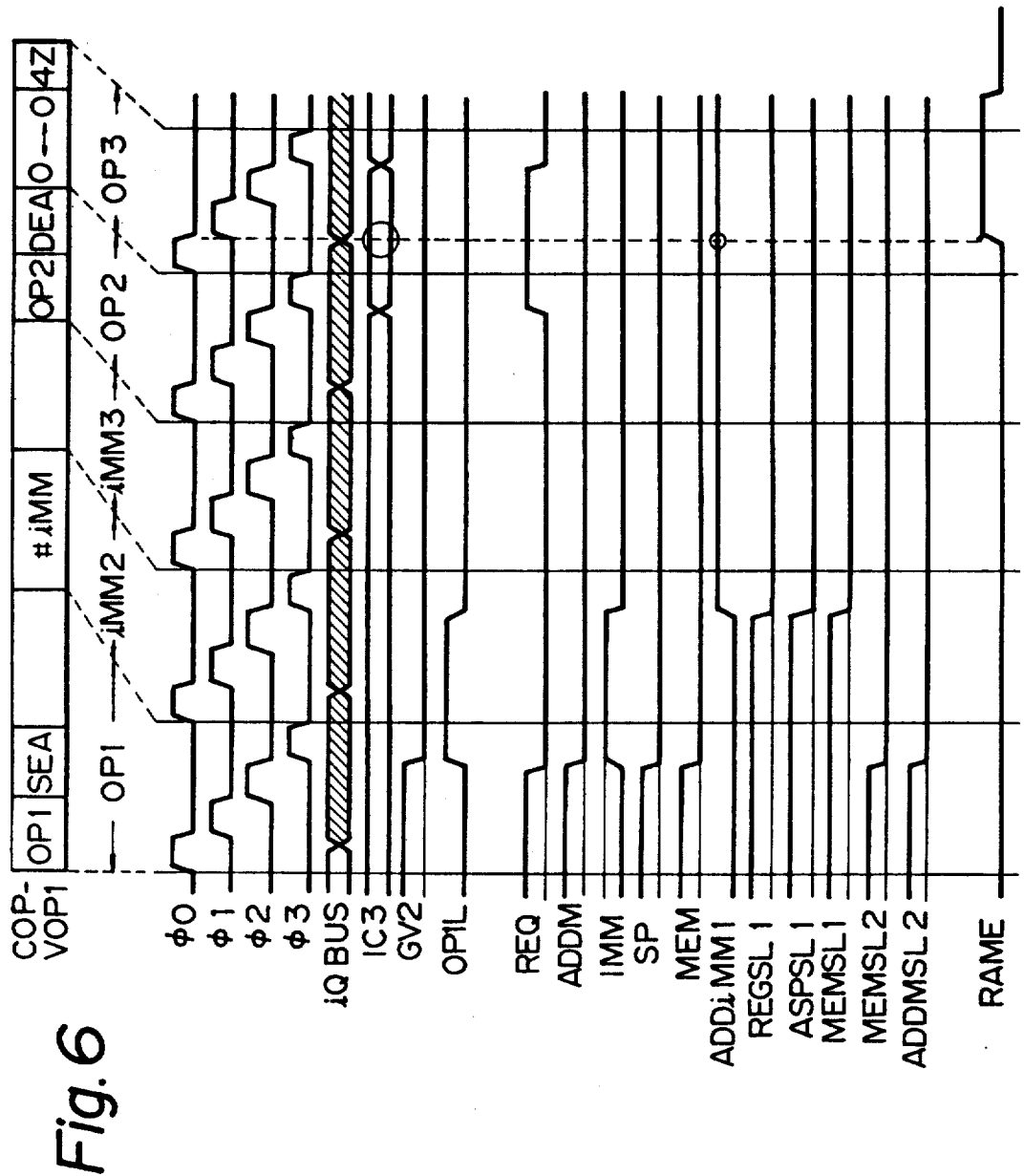
FIG. 6 is a timing chart illustrating an example of the operation of the embodiment of FIG. 2.

FIG. 6 shows an operation timing chart of a COP-VOP (CO-Processor operation-Vector OPeration) instruction designating an immediate value of #iMM-(iMM2, iMM3) as a source operand.

As shown in FIG. 6, addressing information provided in a cycle OP1 is held in response to a latch signal OP1L, and decoded in an end cycle OP2. The decoded information is checked according to instruction tag information signals IC3 to IC0 provided by the instruction decoding units 31 and 32. In a cycle OP3, a reserved instruction exception indication signal RAME is generated in response to a control signal φ1, and transferred to the exception processing controlling unit 10.

As explained above, according to the present invention, where the data processor decodes a train of instructions in which an addressing field to be checked by an operation code is arranged before the operation code concerned, i.e., where the instruction tag information IC indicates that it is an instruction to check undefined addressing of the addressing field decoded in the preceding cycle, the exception detecting unit 61 can detect the undefined addressing based on the output ADG1 of the holding circuit 60. Therefore, it becomes unnecessary to set a special cycle for the checking of operands as seen in the prior art and it is possible to check inhibition rules of the defined addressing in the preceding stage by decoding the operation code in the present cycle. As a result, it is possible to check undefined addressing prescribed for each instruction without lowering an instruction execution performance of the data processor.

Although the present invention has been disclosed and described by way of one embodiment, it is apparent to those skilled in the art that other embodiments and modifications of the present invention are possible without departing from the spirit or essential features thereof.

We claim:

1. A data processor decoding and executing a train of instructions including a plurality of sets of an instruction code field and a corresponding addressing field, said data processor comprising:

decoding means for decoding one instruction, said instruction including instruction code field and the corresponding addressing field, in a plurality of cycles, and outputting instruction tag information and addressing information in response to a control signal generated at a predetermined frequency;

holding means, operatively connected to said decoding means, for holding for a predetermined number of cycles the addressing information from said decoding means decoded in a preceding cycle, and outputting a holding result in response to the control signal; and detecting means, operatively connected to said decoding means and said holding means, for detecting undefined addressing in an addressing field decoded in a preceding cycle, or based on a result decoded in a following cycle, wherein the detecting means makes a determination whether said instruction tag information requires checking of undefined addressing in the addressing field decoded in a present cycle of execution or in the preceding cycle.

2. A data processor as set forth in claim 1, wherein when said detecting means detects undefined addressing in an addressing field decoded in a preceding cycle, said detecting means detects the undefined addressing based on the holding result, and when said detecting means detects undefined addressing of the addressing field decoded in a present cycle, said detecting means detects the undefined addressing based on the addressing information.

3. A data processor as set forth in claim 2, wherein said decoding means comprises:

first decoding means for decoding the instruction code field, and outputting the instruction tag information in response to the control signal, and second decoding means for decoding the addressing field, and outputting the addressing information in response to the control signal.

4. A data processor as set forth in claim 3, wherein said decoding means further comprises transmitting means for transmitting an operation mode into a next cycle, means for decoding additional information included in the train of instructions of variable length, and control means for forming a current decoding cycle of instruction codes and sequentially selecting each of the outputs of said first and second decoding means, transmitting means, and additional decoding means according to a decoding cycle, whereby said detecting means outputs a signal indicating a detection of undefined addressing.

5. A data processor as set forth in claim 4, wherein said decoding means further comprises means, responsive to control timing signals from said control means, for latching each input to and output from said first and second decoding means, said transmitting means and said additional decoding means.

* * * * *

UNITED STATES PATENT AND TRADEMARK OFFICE
CERTIFICATE OF CORRECTION

PATENT NO. : 5,247,625
DATED : September 21, 1993
INVENTOR(S) : Akihiro Yoshitake et al.

It is certified that error appears in the above-identified patent and that said Letters Patent is hereby corrected as shown below:

Col. 1, line 14, "indefined" should be --undefined--.

Col. 3, line 26, "art it" should --art. It--.

Col. 5, line 32, "and AND" should be --an AND--;

line 36, "and OR" should be --an OR--; and line 64, "and NAND" should be --an NAND--.

Signed and Sealed this

Twenty-fourth Day of May, 1994

Attest:

BRUCE LEHMAN

*Attesting Officer*   *Commissioner of Patents and Trademarks*